United States Patent

[11] 3,535,990

[72] Inventor Wilhelm Kunze
 Wurttemberg, Germany
[21] Appl. No. 686,523
[22] Filed Nov. 29, 1967
[45] Patented Oct. 27, 1970
[73] Assignee Agfa Gevaert Aktiengesellschaft
 Leverkusen, Germany
[32] Priority April 29, 1967, May 20, 1967
[33] Germany
[31] R 45,918 and R 46,063

[54] PHOTOGRAPHIC CAMERA
 23 Claims, 10 Drawing Figs.
[52] U.S. Cl. ............................................. 95/11
[51] Int. Cl. ..................................... G03b 19/00
[50] Field of Search ........................ 95/11(Misc.),
 11(Lamp), 11.5; 240/1.3, 37, 37.1; 116/114.10

[56] References Cited
UNITED STATES PATENTS
2,967,469 1/1961 Lachaize ................. 95/11
3,107,593 10/1963 Hausmann et al ......... 95/11
3,374,458 3/1968 Durr ........................ 240/1.3X
3,374,719 3/1968 Horton et al ............. 95/11
3,443,497 5/1969 Bihlmaier ................. 95/11

Primary Examiner—John M. Horan
Assistant Examiner—Fred L. Braun
Attorney—Michael S. Striker ABSTRACT: A photographic camera wherein the top panel of the housing has an aperture and the housing accommodates a socket for reception of a flashbulb or a multiple flashbulb holder. The aperture can be covered or uncovered by a first slide which is movable by hand and overlies a second slide which is movable independently of the first slide to select the exposure time. The second slide carries symbols which indicate various settings of the shutter and the position of the first slide. Selected symbols can be observed through a window of the first slide and/or through a window in the top or rear panel of the housing. These symbols include two flash symbols which are concealed when the first slide covers the aperture to thus prevent access to the socket.

Patented Oct. 27, 1970

3,535,990

INVENTOR:
WILHELM KUNZE
BY Michael S. Striker,
Attorney

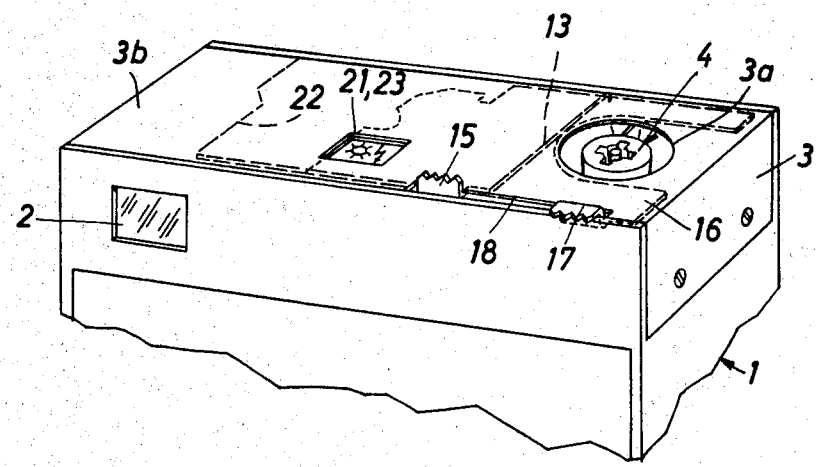
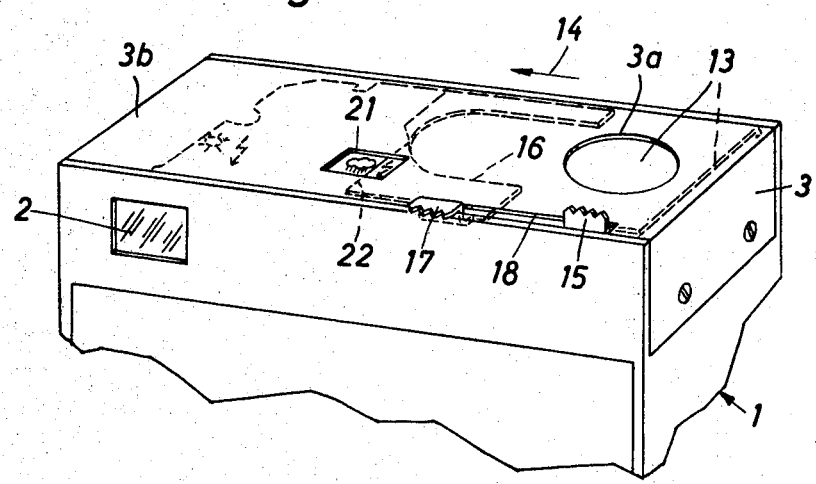

Patented Oct. 27, 1970

INVENTOR:
WILHELM KUNZE
BY Michael S. Striker
Attorney

PHOTOGRAPHIC CAMERA

BACKGROUND OF THE INVENTION

The present invention relates to photographic cameras in general, and more particularly to improvements in cameras which can be used with or without artificial illumination of the subject. Still more particularly, the invention relates to cameras of the type wherein at least one member of the illuminating arrangement which furnishes artificial light is mounted in or is carried by the housing of the camera.

It is already known to provide a photographic camera, particularly a still camera, with a shutter which can furnish a relatively small number of exposure times, for example, a relatively short first exposure time of one-ninetieth of a second for operation in daylight and a relatively long second exposure time of one-thirtieth of a second for operation is artificial light. Such cameras are intended for use by inexperienced photographers or for use by amateurs who do not wish to devote much time to advance their knowledge of photography. Therefore, the cameras are normally provided with various symbols which facilitate proper setting of the shutter for operation in daylight or for operation with artificial illumination of the scene or subject. However, even such symbols are often insufficient to ensure that the person using the camera will not fail to select a satisfactory exposure time for operation in daylight or for operation with flash or other sources of artificial illumination. For example, it happens frequently that an operator attaches a flashbulb, an electronic flash unit or a multiple flashbulb holder but forgets to set the shutter for operation with artificial illumination of the subject. Inversely, it can happen that the user detaches or disconnects an illuminating arrangement but forgets to set the shutter for shorter exposure times which are needed for operation in broad daylight.

Attempts to reduce the number of manipulations which are necessary when the camera is reset from operation in daylight to operation with artificial illumination or vice versa include the provision of automatic shutter adjusting devices which are operated in response to attachment or detachment of a flash unit or the like so that the shutter is automatically adjusted and furnishes an optimum exposure time when the flash unit is properly attached to the housing of the camera. A drawback of such cameras is that the exposure time which is automatically selected in response to attachment of a flash unit or the like is not available for operation in daylight. For example, it can happen that the relatively long exposure time needed for operation with a flash unit is equally satisfactory for operation in daylight when the intensity of scene light is low.

It is also known to provide a camera with an adjusting device which can set the shutter to furnish two or more different exposure times for operation in daylight. One such exposure time can be identical with that exposure time which is selected automatically in response to attachment of a flash unit or other illuminating arrangement. A drawback of such cameras is that the flash unit cannot be used in broad daylight, i.e., when the illumination of the subject by a flash unit or the like is needed to soften the shadows produced on a clear sunny day or to effect additional illumination of details which are nearest to the objective. For example, and assuming that the attachment of a flash unit automatically results in setting of the shutter for an exposure time of one-ninetieth of a second, the user of the camera might wish to make exposures in broad daylight with an exposure time of one-thirtieth of a second and with artificial illumination of the subject. This is impossible if the attachment of the flash unit automatically results in setting of the shutter for an exposure time of one-ninetieth of a second. Thus, the use of the flash unit in broad daylight would necessarily result in overexposure of the subject.

SUMMARY OF THE INVENTION

It is an object of my invention to provide a simple and compact photographic camera for operation in daylight and/or with artificial illumination of the subject wherein the shutter is automatically adjusted to furnish a satisfactory exposure time when the camera is to be used exclusively with an illuminating arrangement but which allows for selection of the same exposure time when the camera is to be used in daylight with or without additional illumination of the subject by a flash bulb or the like.

Another object of the invention is to provide the camera with a novel system of symbols which enable an inexperienced user to properly select the exposure values for operation in daylight with or without artificial illumination or for operation with artificial illumination in the absence of daylight.

A further object of the invention is to provide a camera which is constructed and assembled in such a way that the operator cannot use an illuminating arrangement when the camera is properly adjusted and set for operation in broad daylight and the user does not intend to use an illuminating arrangement.

An additional object of the invention is to provide a camera which can be manipulated by beginners and/or by persons not fully familiar with the function of the shutter.

A concomitant object of the invention is to provide the camera with a novel system for symbols or indicia which facilitate rapid and accurate setting for use in daylight, in artificial light or in daylight with additional illumination of the subject or scene by a flash unit or the like.

Still another object of my invention is to provide the above outlined camera with simple, compact and inexpensive means for adjusting the shutter and for permitting or preventing the use of an illuminating arrangement.

Another object of the invention is to provide a camera wherein the devices which adjust the shutter and permit or prevent the use of an illuminating arrangement can be manipulated as a unit, at least for certain settings of the camera.

The improved camera comprises a housing, adjustable shutter means arranged to provide a plurality of exposure times including at least one relatively short exposure time for operation in broad daylignt and at least one realtively long exposure time for operation with artificial illumination of the subject, illuminating means including a socket, an accessory shoe or an analogous member mounted in or on the housing and adapted to cooperate with a detachable portion of the illuminating arrangement, control means preferably including a first slide movable with reference to the housing between first and second positions to respectively prevent and permit access to the aforementioned member of the illuminating means, and adjusting means preferably including a second slide movable with reference to the housing between a plurality of positions and operatively connected with the shutter means to select the exposure time. The adjusting means is movable independently of the control means and vice versa so that each exposure time can be selected irrespective of whether or not the member of the illuminating means is accessible, i.e., the operator can select a shorter or longer exposure time for exposures with or without artificial illumination of the subject.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a similar view but showing the control slide in a different position;

FIG. 4 is a similar view but showing the adjusting slide in a different position;

DESCRIPTION OF THE PREFERRED EMBODIMENTS

Figure 1:
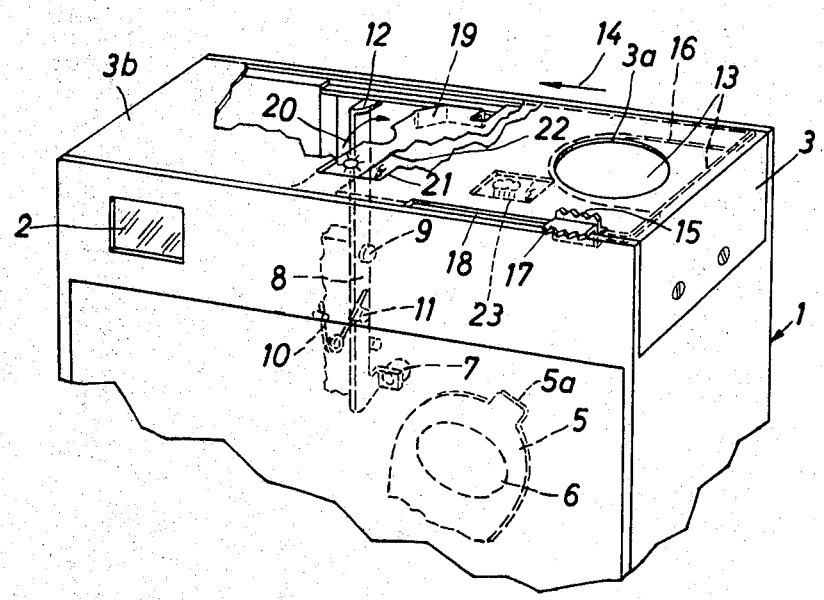
FIG. 1 is a fragmentary perspective view of a still camera which embodies one form of the present invention and wherein the handgrip portions of the slides extend through a slot provided between the top and rear panels of the camera housing.

Referring first to FIGS. 1 to 4, there is shown a still camera which comprises a box-shaped housing 1 having an upper portion 3 containing a view finder 2. The front wall (not shown in FIGS. 1 to 4) of the housing 1 carries a lens mount for an objective which registers with an opening 6 serving to admit light to unexposed film frames. The opening 6 is normally covered by the blade 5 of an adjustable shutter which can furnish at least two exposure times, a longer one intended mainly for operation with artificial illumination of the subject and a shorter one intended mainly for operation in daylight. The top panel 3b of the upper portion 3 is provided with an aperture 3a at a level above an indexible socket 4 (see FIG. 2) constituting one member of an illuminating arrangement. In the illustrated embodiment, the socket 4 can receive the plug of a conventional multiple flashbulb holder (not shown) which is available on the market under the name "Flashcube" and comprises four flashbulbs each located in front of a suitable reflector. The socket 4 is indexible in a well known manner, either manually, in response to actuation of the film transporting mechanism, or in response to actuation of the shutter release, so as to place successive unfired flashbulbs into a position for illumination of the subject.

The shutter of the camera shown in FIGS. 1 to 4 is of the so-called impeller type. The blade 5 can be propelled from the position shown in FIG. 1 to permit entry of light through the opening 6 when the operator actuates the shutter release. The length of exposure is determined by the extent to which the shutter blade 5 can be moved from the normal or starting position shown in FIG. 1, and such extent is determined by an adjusting member in the form of a slide 16 which is reciprocable in the top portion 3 and has a serrated handgrip portion or knob 17 extending rearwardly of the upper portion 3 through an elongated slot 18 in the top panel 3b. The adjusting member 16 (hereinafter called adjusting slide) forms part of an adjusting unit which further comprises a two-armed lever 8 turnable about the axis of a pivot pin 9 fixed to the housing 1, the lever 8 being biased by a torsion spring 10 which tends to maintain the lower arm 7 of the lever in the position shown in FIG. 1 in which this arm extends into the path of movement of a projection 5a on the shutter blade 5 to reduce the extent to which the blade can move from the illustrated starting position. The upper arm 12 of the lever 8 constitutes a follower and is provided with an inclined face which can be engaged by a suitably inclined cam 19 on the adjusting slide 16 to rock the lever 8 about the axis of the pivot pin 9 (arrow 20) and to remove the lower arm 7 from the path of movement of the projection 5a on the shutter blade 5 when the slide 16 is moved to the position shown in FIG. 2 or 4. This lengthens the exposure time because the blade 5 is then free to move beyond the intermediate position which it assumes when its projection 5a strikes against the lower arm 7. The lower arm 7 of the lever 8 can carry two or more stops located at different distances from the projection 5a so that the duration of exposure time will depend on the angular position of the lever 8, i.e., on the position of the lower arm 7 with reference to the projection 5a. Such arrangement renders it possible to adjust the shutter to furnish three or more exposure times. The spring 10 normally maintains the lever 8 in the position of FIG. 1 in which the lower arm 7 abuts against a fixed stop 11.

When the lower arm 7 assumes the position shown in FIG. 1, the camera is set for operation in daylight because the shutter furnishes a short exposure time, i.e., the arm 7 extends into the path of movement of the projection 5a so that the blade 5 is arrested in response to a relatively short angular movement in a counterclockwise direction. The means for propelling the blade 5 from the position shown in FIG. 1 in response to actuation of the shutter release is not shown in the drawings.

Figure 2:
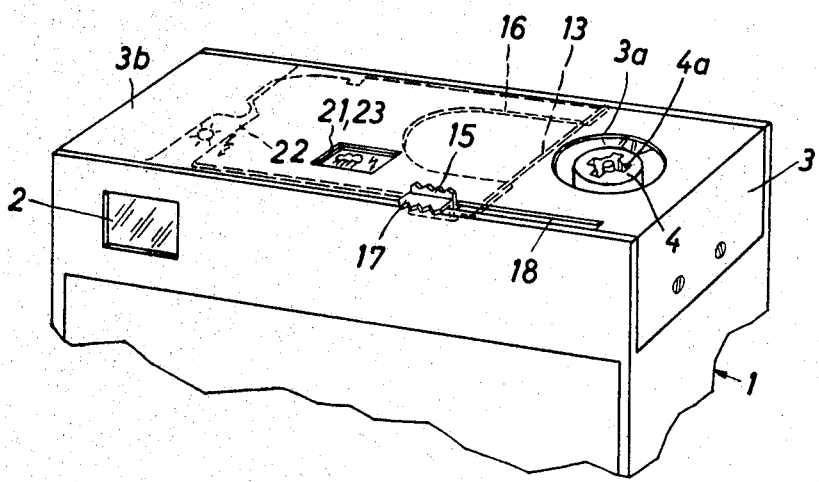
FIG. 2 is a similar view but showing the two slides in different positions.

In accordance with a feature of the present invention, the camera of FIGS. 1 to 4 is further provided with a control member 13 which also resembles a slide and is guided in the top panel 3b of the upper portion 3 so as to be slidable at a level above the adjusting slide 16. The control slide 13 is provided with a serrated handgrip portion or knob 15 which extends upwardly from the slot 18 and can be grasped by hand to move the slide 13 between two end positions. The knob 15 is preferably identical with the knob 17. The purpose of the control slide 13 is to permit or prevent access to the socket 4, i.e., to permit or prevent attachment of a multiple flashbulb holder. It is desirable to conceal the socket 4 when the camera is to be used in daylight or when the camera is to be used without artificial illumination of the subject in order to 90°, entry of foreign matter into the preferably cruciform cavity or recess 4a of the socket. The arrow 14 indicates the direction in which the control slide 13 can be moved by hand from the right-hand end position shown in FIG. 1 in which the right-hand portion of the control slide overlies the aperture 3a and the socket 4. The second end position of the control slide 13 is shown in FIGS. 2 and 3. It will be noted that the knobs 15, 17 are located in two mutually inclined planes which make an angular of 90°, but it is equally possible to select a different inclination and to replace the illustrated toothed or serrated knobs with other types of handgrip portions. The surfaces bounding the ends of the slot 18 in the upper portion 3 of the housing 1 constitute two stops which determine the end positions of the slides 13 and 16. In each of the four possible settings of the slides 13 and 16, the knobs 15, 17 are adjacent to each other (FIGS. 1 and 2) or are disposed at the opposite ends of the slot 18 (FIGS. 3 and 4).

The adjusting slide 16 carries symbols which are indicative of the various settings of the camera. In the embodiment of FIGS. 1 to 4, the slide 16 carries a first symbol representing the sun and indicating exposures in daylight with a short exposure time, two symbols each representing a thunderbolt and respectively indicating exposures in artificial light or in daylight with additional illumination of the subject by a flashbulb or the like, and a further symbol in the form of a cloud to indicate exposures in daylight but with a longer exposure time. The top panel 3b of the upper part 3 has a window 21 to permit observation of symbols. This top panel has two walls which are respectively disposed above the slide 13 and below the slide 16. The latter slide has a bifurcated right-hand end portion whose prongs straddle the aperture 3a when the knob 17 assumes the right-hand end position shown in FIG. 1 or 3 The left-hand edge portion of the upper slide 13 is denoted by the numeral 22.

The control slide 13 has a window 23 which registers with the window 21 when the control slide assumes the position shown in FIG. 2 or 3.

The operation is as follows:

FIG. 1 illustrates the camera with the slides 13 and 16 set for operation in daylight without artificial illumination of the subject. Such setting is desirable when the intensity of daylight is sufficient for satisfactory exposures with a short exposure time. The right-hand portion of the control slide 13 overlies the aperture 3a so that the socket 4 is concealed, i.e., the operator cannot attach a multiple flashbulb holder because the knob 15 of the control slide 13 is held in its right-hand end position. The knob 17 of the adjusting slide 16 also assumes its right-hand end position (adjacent to the knob 15) so that the cam 19 is disengaged from the upper arm 12 of the lever 8 and the torsion spring 10 is free to maintain the lower arm 7 in abutment with the fixed stop 11. Therefore, the lower arm 7 extends into the path of movement of the projection 5a on the shutter blade 5 and the latter is arrested after a relatively short angular displacement in a counterclockwise direction, as viewed in FIG. 1. The left-hand edge portion 22 of the upper slide 13 overlies the left-hand thunderbolt symbol on the top face of the lower slide 16 but the sun symbol is observable through the window 21 so that, by looking through this window, the operator immediately notes that the camera is set for operation in daylight without artificial illumination of the subject. Thus, even an inexperienced amateur photographer can rapidly set the camera for operation in daylight without artificial illumination of the subject. When the shutter release is actuated, an impeller (not shown) propels the blade 5 from the starting position shown in FIG. 1 and causes the projection 5a to strike against the lower arm 7 whereby the shutter blade rebounds and returns to the starting position under the bias of a spring to again close the opening 6. The exposure time is relatively short because the angular displacement of the blade 5 is less than the maximum possible angular displacement which latter takes place when the lower arm 7 of the lever 8 is withdrawn from the path of movement of the projection 5a.

If the operator thereupon decides to move the knobs 15,17 to the left-hand end positions shown in FIG. 2, the camera is set for operation with artificial illumination of the subject or for exposures in daylight with poor illumination of the subject. The control slide 13 is then moved to the left and beyond the aperture 3a so that the socket 4 is readily accessible and can be coupled with the plug of a multiple flashbulb holder. The cam 19 of the adjusting slide 16 engages the upper arm 12 of the lever 8 and maintains the lower arm 7 away from the path of movement of the projection 5a on the shutter blade 5. Thus, when the operator actuates the shutter release, the blade 5 can move to its leftmost position and provides a longer exposure time because it takes longer before the blade returns into registry with the opening 6. By looking at the window 21, the operator sees the cloud symbol and the right-hand thunderbolt symbol indicating that the camera is ready to make exposures with artificial illumination of the subject or to make exposures in daylight when the intensity of scene light is low.

If the operator decides to leave the adjusting slide 16 in the right-hand end position of FIG. 1 but to move the control slide 13 to the left-hand end position of FIG. 2, the camera is ready to make exposures in daylight with or without additional illumination of the subject by an illuminating arrangement including the socket 4. The window 21 then permits observation of the sun symbol and the left-hand thunderbolt symbol (see FIG. 3) to inform the user that the camera can make exposures with a short exposure time, either in daylight alone or in daylight and with additional illumination of the subject by a flashbulb or the like. This is often desirable to soften the shadows at that side of a subject which is not directly exposed to sun or to further illuminate those parts of the subject which are nearest to the camera.

If the control slide 13 remains in the end position of FIG. 1 but the adjusting slide 16 is moved to the end position of FIG. 2, the user can see only the cloud symbol. This is shown in FIG. 4. The camera is then ready to make exposures in daylight when the intensity of scene light is low, but without artificial illumination of the subject. The exposure time is long because the cam 19 engages the upper arm 12 of the lever 8 and causes the spring 10 to store energy because the lower arm 7 is remote from the stop 11 and cannot prevent movement of the shutter blade 5 to its left-hand end position.

It is clear that the camera of FIGS. 1 to 4 can be modified in a number of ways. For example, it is possible to employ other types of adjustable shutters which can furnish two or more exposure times one of which is suited for operation with artificial illumination of the subject and at least one other of which is suitable for operation in daylight without artificial illumination. The shutter may have two or more blades, and the operative connection between the adjusting slide 16 and the shutter may be modified without departing from the spirit of the present invention. For example, such operative connection may include a system of gears, a link train, magnetic means and/or others. Also, the socket 4 may be replaced by an accessory shoe for a conventional electronic flash unit or for a flash unit which can receive only one flashbulb at a time. Furthermore, the socket 4 may be designed to receive individual flashbulbs, i.e., not a multiple flashbulb holder. The invention can be embodied in a motion picture camera.

Figure 5:
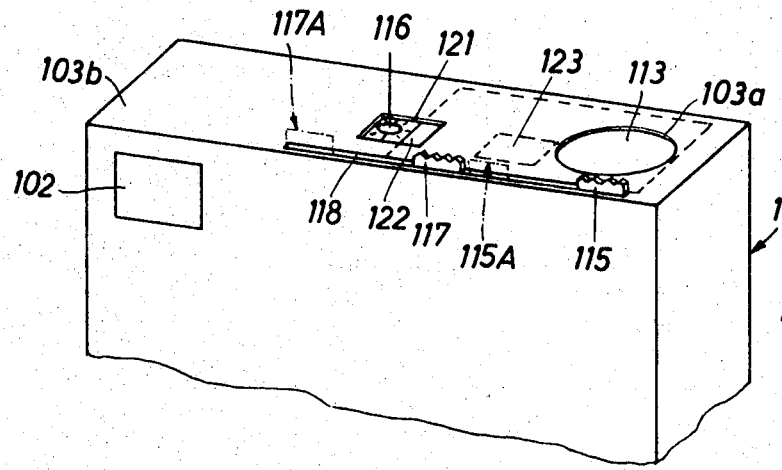
FIG. 5 is a fragmentary perspective view of a second camera.

FIG. 5 illustrates a portion of a second still camera. The top panel 103b of the housing 101 is provided with an elongated slot 118 which is adjacent to the rear panel of the housing. The aperture of the top panel 103b is shown at 103a and the view finder at 102. In this embodiment of the present invention, the two handgrip portions or knobs 115, 117 which respectively form part of a control slide 113 and an adjusting slide 116 extend upwardly beyond the slot 118 and are located in a common vertical plane. Also, and contrary to the showing of FIG. 1, the knobs 115, 117 are not adjacent to each other when the control slide 113 covers the aperture 103a to conceal the socket (not shown) of the illuminating arrangement and when the adjusting slide 116 is in a position in which only the sun symbol (operation in broad daylight without artificial illumination of the subject) is observable through the window 121 of the top panel 103b. The left-hand edge portion 122 of the control slide 113 covers the left-hand thunderbolt symbol on the adjusting slide 116 because the control slide covers the aperture 103a to prevent access to the socket. If the knob 117 is moved to the position 117A and the knob 115 remains in the solid-line position, the slide 116 adjusts the shutter (not shown in FIG. 5) substantially in the same way as shown in FIG. 1 to lengthen the exposure time. At the same time, the cloud symbol on the top face of the adjusting slide 116 becomes visible to the left of the edge portion 122 to indicate that the camera is set for operation in daylight, without artificial illumination of the subject, and can furnish a relatively long exposure time (for example, an exposure time of one-thirtieth of a second).

If the knob 117 remains in the solid-line position but the user moves the knob 115 to the phantom-line second position 115A, the exposure time remains short but the camera can be used with or without a flash unit or another suitable illuminating arrangement. The control slide 113 has a window 123 which moves into registry with the window 121 when the knob 115 assumes the position 115A whereby the user can see the sum symbol as well as the left-hand thunderbolt symbol on the adjusting slide 116 and is informed that the camera will furnish a relatively short exposure time (e.g., an exposure time of one-ninetieth of a second) but can be used with or without an illuminating arrangement.

Finally, and if the knobs 115, 117 are moved to the phantom-line positions 115A, 117A, the camera is set for operation in daylight with or without artificial illumination of the subject and can furnish a relatively long exposure time. The cloud symbol and the right-hand thunderbolt symbol are then moved below the window 121 and the window 123 is in registry with the window 121 so that the user can determine at a glance that the camera can make exposures in daylight when the intensity of scene light is rather low as well as in artificial light because the control slide 113 exposes and affords access to the socket of the illuminating arrangement. In the embodiment of FIG. 5, the knobs 115, 117 are adjacent to each other when the camera can make exposures with short exposure time, either in daylight or in daylight with artificial illumination of the subject, and the knobs 115, 117 are located at a maximum distance from each other (positions 115, 117A) when the camera is ready to make exposures in daylight with long exposure time and while the control slide 113 conceals the socket.

The median portion of the slot 118 may be provided with a transverse partition serving to arrest the knob 117 in the solid-line position or the knob 115 in the phantom-line position 115A. Though FIG. 5 shows that the distances covered by the knobs 115, 117 during movement between their respective solid-line and phantom-line positions are equally long, it is also possible to use knobs and slides which cover different distances. Furthermore, the slide 116 can be moved to one or more intermediate positions to provide additional exposure times. In such cameras, the window 123 must be longer and the adjusting slide 116 can be provided with additional symbols (for example, numerals) indicating additional exposure times.

Figure 6:
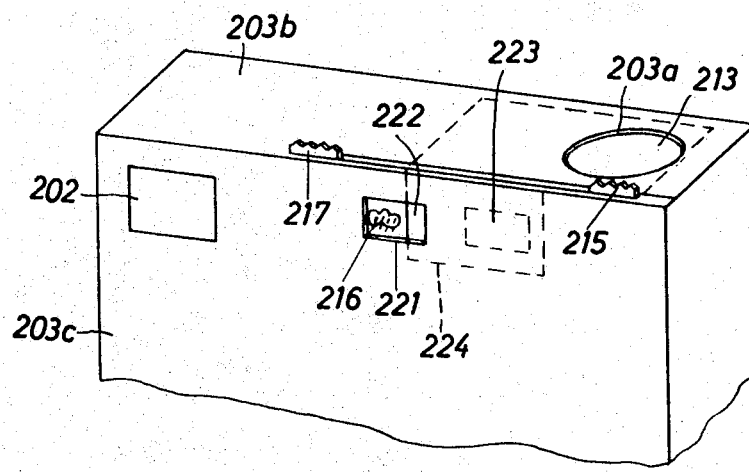
FIG. 6 is a fragmentary perspective view of a third camera.

FIG. 6 shows a third camera which is similar to the camera of FIG. 5. The control slide 213 has an extension or flap 224 which is provided with a window 223 and is adjacent to the rear wall or panel 203c of the housing 201. The adjusting slide 216 also comprises an extension which is provided with symbols and is overlapped by the extension 224. The knobs of the slides 213, 216 are respectively shown at 215 and 217. The positions of the slides 213, 216 in FIG. 6 correspond to those shown in FIG. 4, i.e., the left-hand edge portion 222 of the extension 224 of the control slide 213 overlies the right-hand thunderbolt symbol on the extension of the adjusting slide 216 but the cloud symbol is observable through a window 221 provided in the rear wall 203c. The right-hand portion of the control slide 213 overlies the socket (not shown) which is installed in the housing 201 below the aperture 203a of the top panel 203b. The adjusting slide 216 then ensures that the shutter furnishes a relatively long exposure time needed for making exposures when the intensity of scene light is low. In order to shorten the exposure time, the operator moves the knob 217 in a direction to the right while the knob 215 remains in the illustrated position. The sun symbol on the extension of the slide 216 is then visible in the window 221 to the left of the edge portion 222. The control slide 213 affords access to the socket below the aperture 203a when the knob 215 is moved in a direction to the left to move the window 223 into registry with the window 221. The extension of the adjusting slide 216 is provided with two thunderbolt symbols for the purposes which were described in connection with FIGS. 1 to 5, i.e., the camera of FIG. 6 can be set to provide a longer exposure for operation in daylight with low intensity of scene light and/or with artificial illumination of the subject, or for operation in broad daylight with or without artificial illumination.

FIGS. 7a to 7d illustrate a fourth embodiment of my camera wherein the knobs 315, 317 of the slides 313, 316 are respectively movable in separate slots 326, 327 provided in the top panel 303b adjacent to the front and rear panels. The aperture is shown at 303a and the window of the top panel 303b is shown at 321.

Figure 7A:
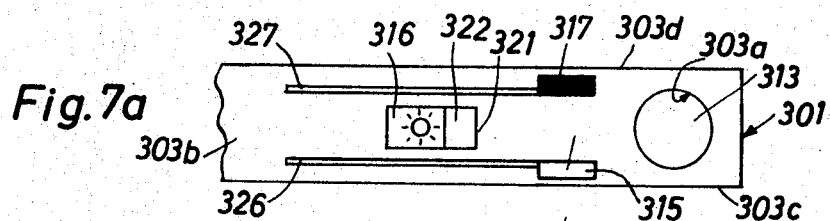
FIG 7a is a fragmentary top plan view of a fourth camera.

In FIG. 7a, the left-hand edge portion 322 of the control slide 313 overlies the left-hand thunderbolt symbol on the top face of the adjusting slide 316 but the sun symbol is exposed because the right-hand edge portion of the slide 313 conceals the socket (not shown) which is located below the aperture 303a. The camera is ready for operation in broad daylight but the multiple flashbulb holder (or another illuminating arrangement) cannot be used.

Figure 7B:
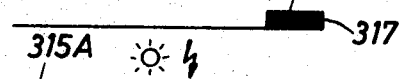
FIG. 7b illustrates the control slide of the fourth camera in a second position.

If the knob 315 is moved to the other end position 315A shown in FIG. 7b, the setting of the shutter remains unchanged but the camera can be used in broad daylight with or without artificial illumination of the subject. The window (not shown) of the control slide 313 then registers with the window 321 of the top panel 303b. Therefore, the two windows permit observation of the sun symbol and of the left-hand thunderbolt symbol on the top face of the adjusting slide 316.

Figure 7C:
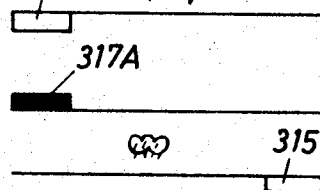
FIG. 7c illustrates the adjusting slide of the fourth camera in a second position.

In FIG. 7c, the knob 315 of the control slide 313 remains in the position shown in FIG. 7a but the knob 317 of the adjusting slide 316 is moved to the other end position 317A in which the left-hand edge portion 322 (See FIG. 7a) of the control slide overlies the right-hand thunderbolt symbol but permits observation of the cloud symbol. The adjusting slide 316 has selected a longer exposure time which is satisfactory for operation in daylight when the intensity of scene light is low.

The socket remains concealed because the right-hand edge portion of the control slide 313 is located below the aperture 303a.

Figure 7D:
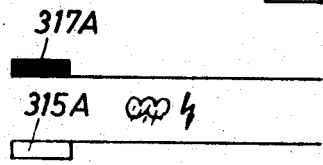
FIG. 7d illustrates both slides of the fourth camera in second positions.

FIG. 7d illustrates the knobs 315, 317 in their left-hand end positions 315A, 317A. The user can see the cloud symbol and the right-hand thunderbolt symbol, i.e., the camera is ready for use in daylight when the intensity of scene light is low, with or without artificial illumination of the subject. The control slide 313 exposes the socket and its window registers with the window 321 in the top wall 303b.

The front and rear panels of the block-shaped housing 301 are respectively shown at 303d, 303c in FIG. 7a.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

I claim:

1. In a photographic camera, a combination comprising a housing; adjustable shutter means arranged to provide a plurality of exposure times; illuminating means comprising a member supported by said housing; control means having first handgrip means and movable thereby with reference to said housing between first and second positions to respectively prevent and permit access to said member; and adjusting means having second handgrip means, said adjusting means being movable by said second handgrip means with reference to said housing between a plurality of positions and being operatively connected with said shutter means to select the exposure time, said adjusting means being movable independently of said control means and vice versa so that each of said plurality of exposure times can be selected irrespective of whether or not said member is accessible and said first handgrip means being movable, in substantial parallelism with said second handgrip means along adjacent parallel paths, so that said first and second handgrip means can be operated by one hand either simultaneously or separately.

2. A combination as defined in claim 1, wherein said housing is provided with an aperture and said member of said illuminating means is located behind said aperture, said control means respectively registering and being spaced from said aperture in said first and second positions thereof.

3. A combination as defined in claim 1, wherein said handgrip means are of identical size and shape.

4. A combination as defined in claim 1, wherein each of said handgrip means is movable with reference to said housing through the same distance.

5. A combination as defined in claim 1, wherein said control means comprises a first slide and said adjusting means comprises a second slide, said housing comprising a top panel and said first slide being located between said second slide and said top panel.

6. A combination as defined in claim 1, wherein said housing comprises top wall means having an elongated edge portion, said handgrip means being adjacent to and being movable in substantial parallelism with said edge portion.

7. A combination as defined in claim 6, wherein said edge portion has a first and second end and wherein said handgrip means are movable along paths which are nearer to one end of said edge portion.

8. A combination as defined in claim 6, wherein said top wall means is provided with slot means through which said first and second handgrip means extend.

9. A combination as defined in claim 8, wherein said slot means comprises a single slot.

10. A combination as defined in claim 1, said handgrip means are located in mutually inclined planes.

11. A combination as defined in claim 1, wherein said housing is provided with slot means for said handgrip means and has surface means bounding said slot means, said surface means being arranged to arrest said first handgrip means in at least one position of said control means and to arrest said second handgrip means in at least one position of said adjusting means.

12. A combination as defined in claim 1, wherein said housing comprises a top panel and a rear panel, one of said panels having slot means adjacent to the other panel and said handgrip means extending outwardly through said slot means.

13. A combination as defined in claim 12, wherein said housing resembles a block.

14. In a photographic camera, a combination comprising a housing having an aperture and slot means; adjustable shutter means arranged to provide a plurality of exposure times, illuminating means comprising a member provided in said housing behind said aperture; control means movable with reference to said housing between first and second positions in which it respectively registers with and is spaced from said aperture to respectively prevent and permit access to said member; and adjusting means movable with reference to said housing between a plurality of positions and operatively connected with said shutter means to select the exposure time, said adjusting means being movable independently of said control means and vice versa so that each of said plurality of exposure times can be selected irrespective of whether or not said member is accessible, said control means and said adjusting means respectively comprising first and second handgrip means extending outwardly through said slot means, said handgrip means being adjacent to each other when said control means registers with said aperture and said adjusting means selects a relatively short exposure time as well as when said control means is spaced from said aperture and said adjusting means selects a relatively long exposure time suitable for exposures with artificial illumination of the subject.

15. In a photographic camera, a combination comprising a housing provided with an aperture and with a single slot; adjustable shutter means arranged to provide a plurality of exposure times; illuminating means comprising a member provided in said housing behind said aperture; control means movable with reference to said housing between first and second positions in which it respectively registers with and is spaced from said aperture to respectively prevent and permit access to said member; and adjusting means movable with reference to said housing between a plurality of positions and operatively connected with said shutter means to select the exposure time, said adjusting means being movable independently of said control means and vice versa so that each of said plurality of exposure times can be selected irrespective of whether or not said member is accessible, said control means and said adjusting means respectively comprising first and second handgrip means each including a serrated knob extending outwardly through said slot, said knobs being located in mutually inclined planes.

16. In a photographic camera, a combination comprising a housing having a window, an aperture and slot means; adjustable shutter means arranged to provide a plurality of exposure times; illuminating means comprising a member provided in said housing behind said aperture; control means movable with reference to said housing between first and second positions in which it respectively registers with and is spaced from said aperture to respectively prevent and permit access to said member; and adjusting means movable with reference to said housing between a plurality of positions and operatively connected with said shutter means to select the exposure time, said adjusting means being movable independently of said control means and vice versa so that each of said plurality of exposure times can be selected irrespective of whether or not said member is accessible, said control means and said adjusting means respectively comprising first and second handgrip means extending outwardly through said slot means, said control means further comprising a first slide and said adjusting means further comprising a second slide provided with a plurality of symbols movable into registry with said window, said first slide being arranged to cover and uncover selected symbols on said second slide in said positions of said control means.

17. A combination as defined in claim 16, wherein said first slide overlies said second slide and wherein said second slide is movable between two positions one of which corresponds to a relatively short exposure time for exposures in daylight and the other of which corresponds to a relatively long exposure time for exposures with artificial illumination of the subject.

18. A combination as defined in claim 17, wherein said housing has surfaces bounding said slot means and arranged to arrest said handgrip means in each position of the respective slide.

19. In a photographic camera, a combination comprising a housing having a top panel, an aperture and slot means; adjustable shutter means arranged to provide a plurality of exposure times; illuminating means comprising a member provided in said housing behind said aperture; control means movable with reference to said housing between first and second positions in which it respectively registers with and is spaced from said aperture to respectively prevent and permit access to said member; and adjusting means movable with reference to said housing between a plurality of positions and operatively connected with said shutter means to select the exposure time, said adjusting means being movable independently of said control means and vice versa so that each of said plurality of exposure times can be selected irrespective of whether or not said member is accessible, said control means and said adjusting means respectively comprising first and second handgrip means extending outwardly through said slot means, said control means further comprising a first slide and said adjusting means further comprising a second slide, said first slide being located between said second slide and said top panel and having a window, said second slide being provided with symbols at least one of which is observable in each position of said slides.

20. A combination as defined in claim 19, wherein said symbols include a pair of symbols indicating artificial illumination of the subject, one of said pair of symbols being exposed by said first slide in said second position of said control means when said adjusting means assumes a first position corresponding to a relatively short exposure time and the other of said pair of symbols being exposed by said first slide in said second position of said control means when said adjusting means assumes a second position corresponding to a relatively long exposure time.

21. A combination as defined in claim 19, wherein said symbols include a pair of symbols indicating artificial illumination of the subject and wherein each of said pair of symbols is concealed by said first slide in the first position of said control means.

22. In a photographic camera, a combination comprising a housing having an aperture and slot means; adjustable shutter means arranged to provide a plurality of exposure times; illuminating means comprising a member provided in said housing behind said aperture; control means movable with reference to said housing between first and second positions in which it respectively registers with and is spaced from said aperture to respectively prevent and permit access to said member; and adjusting means movable with reference to said housing between a plurality of positions and operatively connected with said shutter means to select the exposure time, said adjusting means being movable independently of said control means and vice versa so that each of said plurality of exposure times can be selected irrespective of whether or not said member is accessible, said control means and said adjusting means respectively comprising first and second handgrip means extending outwardly through said slot means, said housing comprising a top panel and a front panel and said slot means comprising a first slot provided in one of said panels for one of said handgrip means adjacent to the other panel and said housing further comprising a rear panel and said slot means further comprising a second slot provided in one of said rear and top panels for the other handgrip means and adjacent to the other of said rear and top panels.

23. In a photographic camera, a combination comprising a housing having a top panel and a rear panel; adjustable shutter means arranged to provide a plurality of exposure times; illuminating means comprising a member provided on said housing; control means movable with reference to said housing between first and second positions to respectively prevent and permit access to said member; and adjusting means movable with reference to said housing between a plurality of positions and operatively connected with said shutter means to select the exposure time, said adjusting means being movable independently of said control means and vice versa so that each of said plurality of exposure times can be selected irrespective of whether or not said member is accessible, said control means comprising a portion overlapped by and movable along said top panel and a first extension overlapped by and movable along said rear panel, said adjusting means comprising a second extension overlapped by and movable relative to said first extension and provided with a plurality of symbols, said rear panel having a window to permit observation of selected symbols in said positions of said control means.